United States Patent [19]
Oh

[11] Patent Number: 5,307,143
[45] Date of Patent: Apr. 26, 1994

[54] METHOD AND CIRCUIT FOR TRANSMITTING A DIRECT CURRENT COMPONENT OF A COLOR SIGNAL

[75] Inventor: Hun-Seok Oh, Osan-City, Rep. of Korea

[73] Assignee: SamSung Electronics Co., Ltd., Suwon, Rep. of Korea

[21] Appl. No.: 808,775

[22] Filed: Dec. 17, 1991

[30] Foreign Application Priority Data

Jan. 11, 1991 [KR] Rep. of Korea .................. 307-1991

[51] Int. Cl.$^5$ ............................................. H04N 7/13
[52] U.S. Cl. ........................................ 348/458; 348/384
[58] Field of Search ............... 358/11, 12, 135, 133, 358/136, 141

[56] References Cited

U.S. PATENT DOCUMENTS

| | | | |
|---|---|---|---|
| 4,817,182 | 3/1989 | Adelson et al. | 358/141 |
| 4,918,524 | 4/1990 | Ansari et al. | 358/133 |
| 4,943,855 | 7/1990 | Bheda et al. | 358/133 |
| 4,967,272 | 10/1990 | Kao et al. | 358/141 |
| 4,969,040 | 11/1990 | Gharavi | 358/135 |
| 5,040,062 | 8/1991 | Knauer et al. | 358/141 |
| 5,048,111 | 9/1991 | Jones et al. | 358/133 |
| 5,097,331 | 3/1992 | Chen et al. | 358/138 |
| 5,136,374 | 8/1992 | Jayant et al. | 358/133 |

*Primary Examiner*—Victor R. Kostak
*Assistant Examiner*—Nathan J. Flynn
*Attorney, Agent, or Firm*—Robert E. Bushnell

[57] ABSTRACT

Disclosed is a method of processing the color signals of a high definition television (HDTV) comprising the steps of 3-dimensionally sampling a given band of image signals into M bands (M is decimation of a positive integer) vertically, horizontally and temporally, further sampling the 3-dimensionally sampled images divided into 4 bands, vertically and horizontally separating DC signals from the lowest frequency regions of the 4 bands, the DC signals being digitally transmitted, transmitting the analog signals of the 4 bands together with the digital data, interpolating the digital data, vertically and horizontally interpolating the interpolated digital data and the analog signals, and 3-dimensionally reinterpolating the output of the sixth step in the vertical, horizontal and time axes to expand.

20 Claims, 4 Drawing Sheets

METHOD AND CIRCUIT FOR TRANSMITTING A DIRECT CURRENT COMPONENT OF A COLOR SIGNAL

BACKGROUND OF THE INVENTION

The present invention relates to a method and a circuit for processing color signals of a high definition television (HDTV), more particularly to a method and circuit for improving the picture quality of the HDTV and transmission efficiency of the color signals of the HDTV.

Generally, the low frequency components of the color signals have large widths like luminance signals, thereby containing almost all the information. Hence, a method is needed for compressing color signals and transmitting digital signals together with analog signals, in order to obtain excellent image signals by the data transmitted via limited channels.

The transmission of the low frequency band signals containing much of the information in accordance with the conventional transmission method, however, results in the sharpness of images being impaired, thus causing degradation of the picture quality.

SUMMARY OF THE INVENTION

It is an object of the present invention to provide a method and circuit for preventing degradation of the picture quality in HDTV.

It is another object of the present invention to provide a method and circuit for improving the transmission efficiency of color signals in HDTV.

According to the present invention, there is provided a method for processing the color signals of an HDTV comprising the steps of 3-dimensionally sampling a given band of image signals into M sub-bands (M=a positive integer) in the vertical, horizontal and time axes, further sampling the 3-dimensionally sampling images divided into n sub-bands (n=positive integer), vertically and horizontally separating DC signals from the lowest frequency regions of the n sub-bands, the DC signals being digitally transmitted, transmitting the analog signals of the n bands together with the digital data, interpolating the digital data, vertically and horizontally interpolating the interpolated digital data and the analog signals, and 3-dimensionally reinterpolating the output of the sixth step in the vertical, horizontal and time axes to expand.

BRIEF DESCRIPTION OF THE DRAWINGS

For a better understanding of the present invention, and to show how the same may be carried into effect, reference will now be made, by way of example, to the accompanying diagrammatic drawings, in which.

DETAILED DESCRIPTION OF A PREFERRED EMBODIMENT

Figure 1:
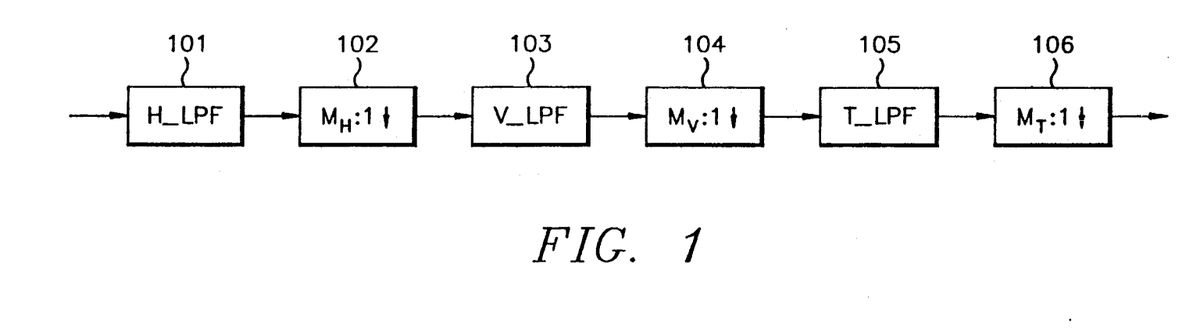
FIG. 1 is a block diagram for illustrating a circuit for 3-dimensionally compressing data.

Referring to FIG. 1, a first horizontal low pass filter (H_LPF) 101 horizontally filters image signals of the video signals. A first sampler 102 is to sample down the filtered outputs of the first horizontal low pass filter 101 at the value of $M_H$:1 ($M_H$:horizontal sampling), thereby reducing the number of the samples.

A first vertical low pass filter (V_LPF) 103 is to vertically filter the outputs of the first sampler 102. A second decimator 104 is to sample down the outputs of the first vertical low pass filter 103 at the value of $M_V$:1 ($M_V$:vertical sampler), thereby reducing the number of the samples.

A first temporal low pass filter (T_LPF) 105 is to temporally filter the outputs of the second sampler 104. A third sampler 106 is to sample down the outputs of the first temporal low pass filter 105 at the value of $M_T$:1 ($M_T$:temporal sampling), thereby reducing the number of the samples.

Figure 7:
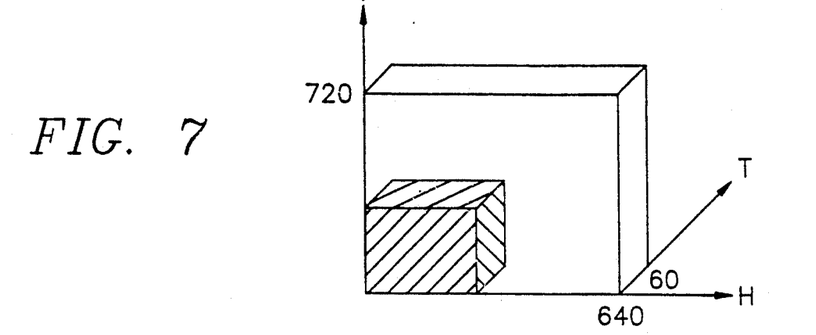
FIG. 7 is a 3-dimensional frequency representation of the color signals, wherein the shaded portion is a compression obtained by the circuit of FIG. 1.

The circuit of FIG. 1 compresses the frequencies of the color signals vertically, horizontally and temporally as shown by the shaded portion of FIG. 7.

Figure 2:
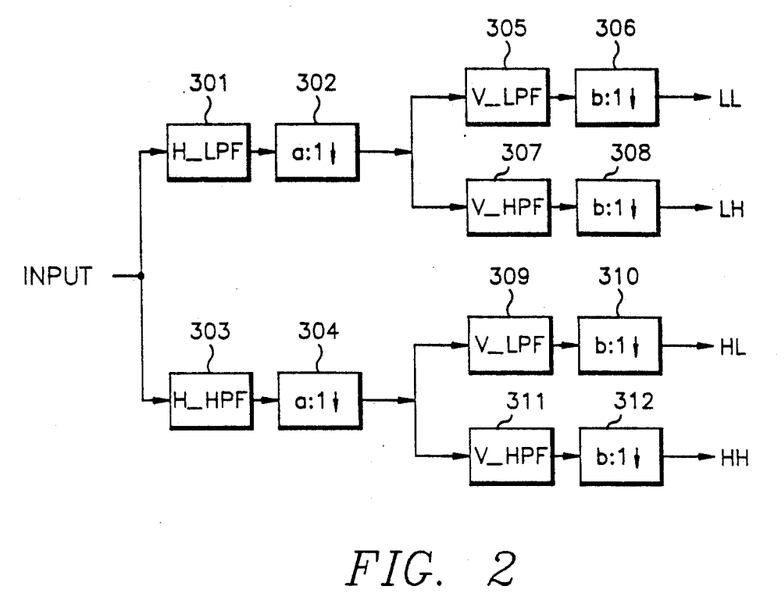
FIG. 2 is a block diagram for illustrating Quadrature Mirror Filter (QMF) separation circuit.

Referring to FIG. 2, a second horizontal low pass filter 301 is to horizontally low-pass-filter the outputs of the third sampler 106. A first horizontal high pass filter 303 is to horizontally high-pass-filter the outputs of the third sampler 106. A fourth sampler 302 is to sample down the outputs of the second horizontal low pass filter 301 at a:1 (a:interpolating factor), thereby reducing the number of the samples, A fifth sampler 304 is to sample down the outputs of the first horizontal high pass filter 303 at a:1, thereby reducing the number of the samples.

A second vertical low pass filter 35 is to vertically low-pass-filter the outputs of the fourth sampler 302. A first vertical high pass filter 307 is to vertically high-pass-filter the outputs of the fourth sampler 302.

A sixth sampler 306 is to sample down the outputs of the second vertical low pass filter 305 at b:1 (interpolating factor), thereby producing a signal region LL with horizontally low and vertically low components. A seventh sampler 308 is to sample down the outputs of the first vertical high pass filter 307 at b:1, thereby producing a signal region LH with horizontally low and vertically high components.

A third vertical low pass filter 309 is to vertically low-pass-filter the outputs of the fifth sampler 304. A second vertical high pass filter 311 is to vertically high-pass-filter the outputs of the fifth sampler 304.

An eighth sampler 310 is to sample down the outputs of the third vertical low pass filter 309 at b:1, thereby producing a signal region HL with horizontally high and vertically low components.

A ninth sampler 312 is to sample down the outputs of the second vertical high pass filter 311 at b:1, thereby producing a signal region HH with horizontally high and vertically high components.

Figure 9:
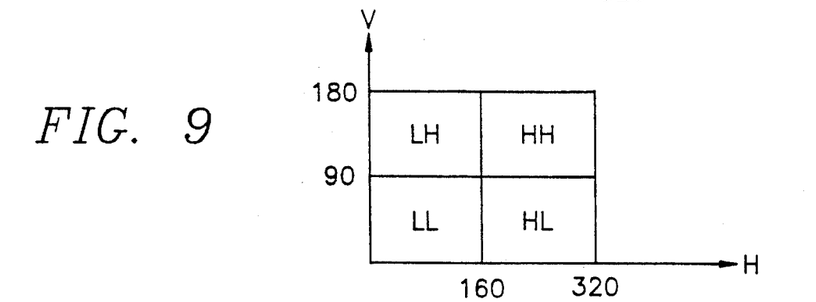
FIG. 9 illustrates the color signals divided horizontally and vertically into 2×2 bands by the circuit of FIG. 2.
Figure 10:
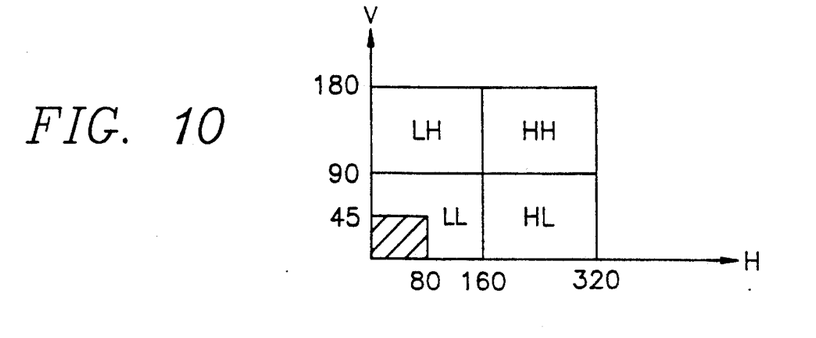
FIG. 10 is a graph for illustrating the DC components in FIG. 9.

The signals are divided by the circuit of FIG. 2, as shown in FIG. 9.

Figure 3:
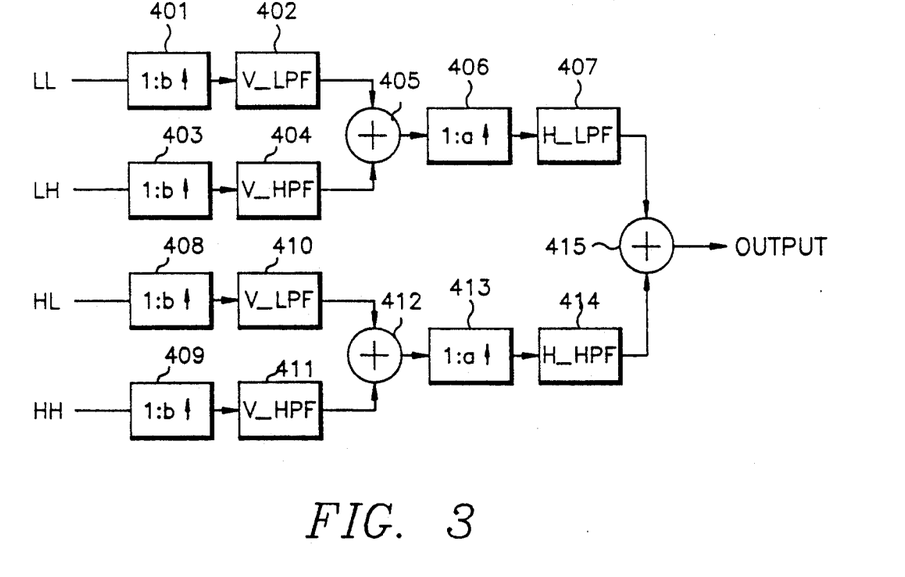
FIG. 3 is a block diagram for illustrating a QMF combination circuit.

Referring to FIG. 3, a first interpolator 401 is to interpolate the LL region of the sixth sampler 306 at 1:b. A second interpolator 403 is to interpolate the LH region of the seventh sampler 308 at 1:b. A third interpolator 408 is to interpolate the HL region of the eighth sampler 310 at 1:b. A fourth interpolator 409 is to interpolate the HH region of the ninth sampler 312 at 1:b.

A fourth vertical low pass filter 402 is to vertically low-pass-filter the output of the first interpolator 401. A third vertical high pass filter 404 is to vertically high-pass-filter the output of the second interpolator 403. By a first adder 405, the output of third vertical high pass filter 404. A fifth vertical low pass filter 410 is to vertically low-pass-filter a given band of the output of third interpolator 408. A fourth vertical high pass filter 411 is to vertically high-pass-filter a given band of the output of the fourth interpolator 409. A second adder 412 add the output of the fifth vertical low pass filter 410 to the output of the fourth vertical high pass filter 411.

A fifth interpolator 406 interpolates the output of the first adder 405 at 1:a. A sixth interpolator 413 is to interpolate the output of the second adder 412 at 1:a. A third horizontal low pass filter 407 is to horizontally low-pass-filter the output of the fifth interpolator 406. A second horizontal high pass filter 414 is to horizontally high-pass-filter the output of the sixth interpolator 413. A third adder 415 adds to the output of the third horizontal low pass filter 407 to the output of the second horizontal high pass filter 414.

Figure 4:
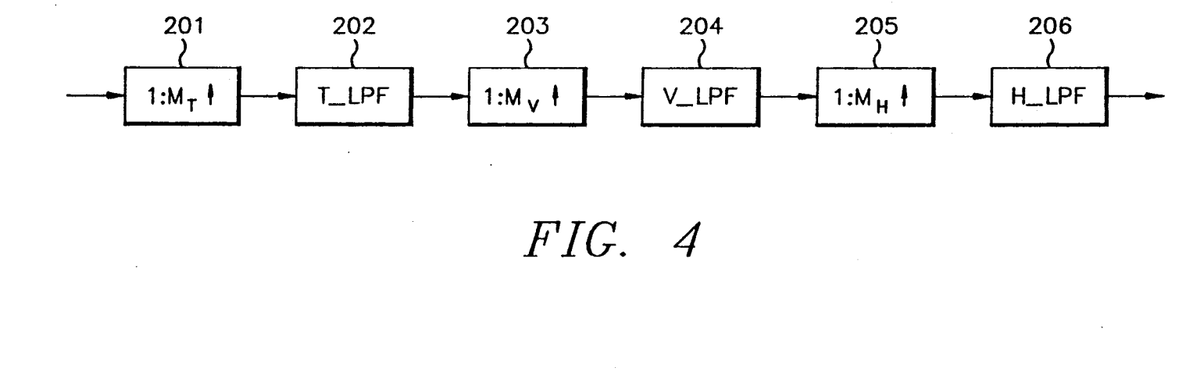
FIG. 4 is a block diagram for illustrating a circuit for 3-dimensionally expanding data.

With reference to FIG. 4, the circuit for 3-dimensionally expanding data includes the following components.

A seventh interpolate 201 interpolates the output of the third adder 415 at 1:$M_T$ by up-sampling. A second temporal low pass filter 202 is to low-pass filter the output of the seventh interpolator 201 in the time axis. An eighth interpolator 203 is to interpolate the output of the second temporal low pass filter 202 at 1:Mv by up-sampling. A sixth vertical low pass filter 204 is to vertically low-pass-filter the output of the eighth interpolator 203. A ninth interpolator 205 interpolates the output of the sixth vertical low pass filter 204 at 1:Mv by up-sampling. A fourth horizontal low pass filter 206 horizontally low-pass-filters the output of the ninth interpolator 205.

The encoding circuit according to the present invention is described with reference to FIG. 5.

A compression circuit 501, which is described in detail in FIG. 1, filters the video signal horizontally, vertically and temporally, and compresses the filtered video signal through the first to third samplers. A QMF (quadrature mirror filter) separation circuit 502, which is described in detail in FIG. 2, filters the output of the compression circuit 501 in the horizontal and vertical axes, and separates the filtered signals into first to fourth division regions LL, LH, HL and HH through the fourth to ninth samplers. A DC extraction circuit 503 extracts DC components from the first division region LL of the QMF separation circuit 502, and transmits the video signals of the LL region in the form of digital signals. A fourth adder 504 adds the output (−) of the first division region LL of the QMF separation circuit 502 to the output (+) of the DC extraction circuit 503, producing a differential signal LL' from the first division region LL The decoding circuit according to the present invention is described with reference to FIG. 6.

Figure 6:
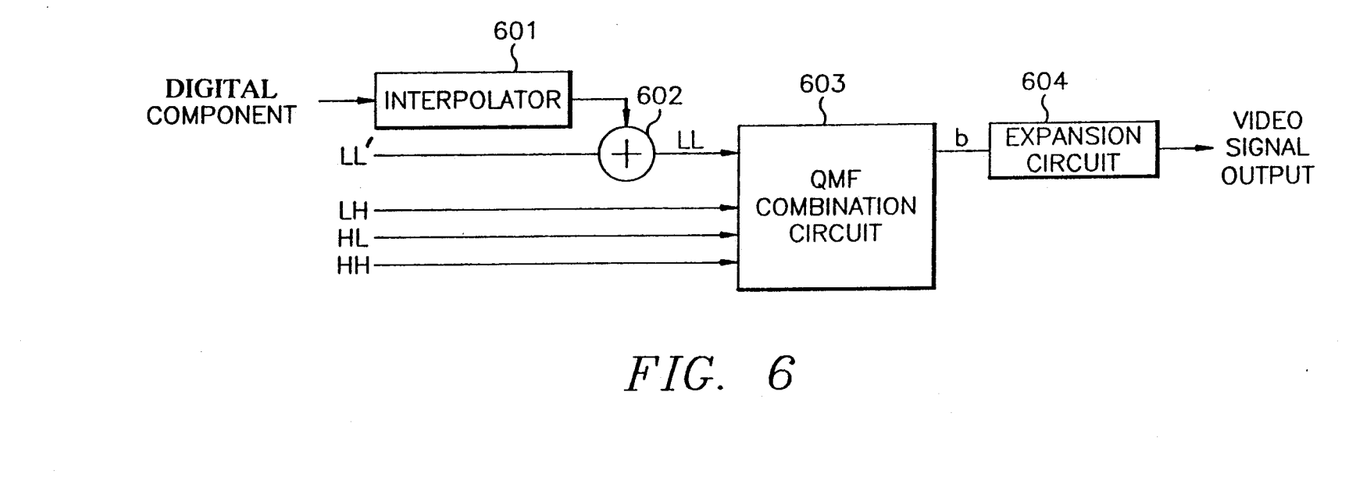
FIG. 6 is a block diagram for illustrating a decoding circuit according to the present invention.

An interpolator 601 interpolates the output of the DC extraction circuit 503. A fifth adder 602 adds the differential signal LL' of the fourth adder 504 to the output of the interpolator 601. A QMF combination circuit 603, which is described in detail in FIG. 3, synthesizes the first division region LL produced from the fifth adder 602 and second to fourth division regions LH, HL and HH generated from the QMF separation circuit 502, by interpolating in an inverse mode to that of the QMF separation circuit 502 and by filtering the interpolated signals horizontally and vertically. An expansion circuit 604 as shown in FIG. 4, expands the outputs of the QMF combination circuit 603, by filtering vertically, horizontally and temporally, and interpolating.

The operation of the inventive circuit will now be described with reference to FIGS. 1 through 10.

Figure 5:
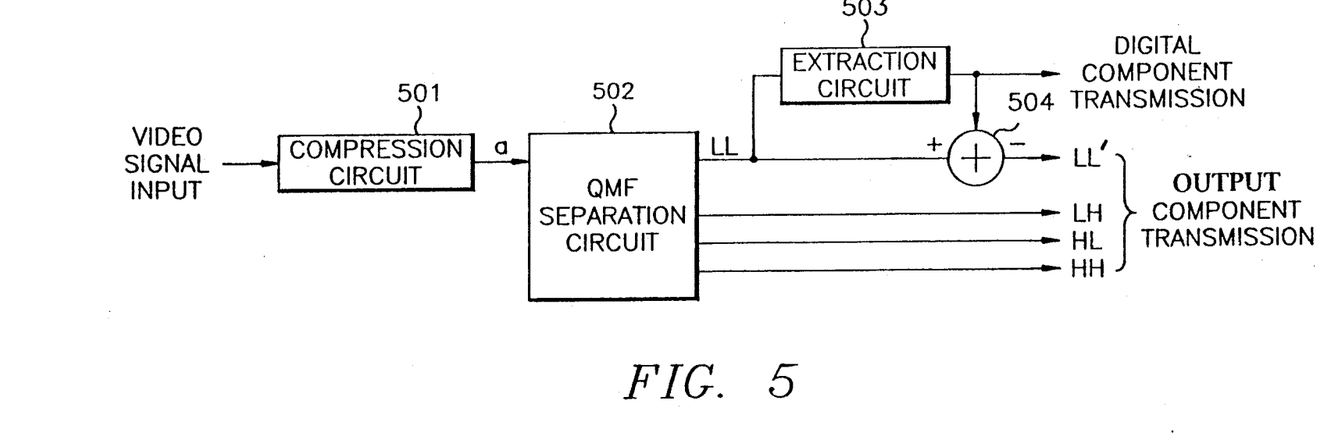
FIG. 5 is a block diagram for illustrating an encoding circuit according to the present invention.

The video signals whose horizontal 640 pixels are divided into eight bands vertical 720 pixels into eight bands, and 60 frames of time axis (T) into four bands, are compressed by the compression circuit 501 of FIG. 5.

The compression circuit 501 filters, 3-dimensionally, a given region of the video signals via the first vertical, horizontal and, temporal low pass filters 101, 103 and 105. The first sampler 102 samples down the output of the first horizontal low pass filter 101 at 2:1. The second sampler 104 samples down the output of the vertical low pass filter 103 at 4:1. The third sampler 106 samples down the output of the first temporal low pass filter 105 at 4:1, as shown by the shaded portion in FIG. 7, shown in an enlarged scale in FIG. 8, wherein there are 180 pixels in the vertical axis, 320 pixels in the horizontal axis, and 15 frames in the time-axis.

Figure 8:
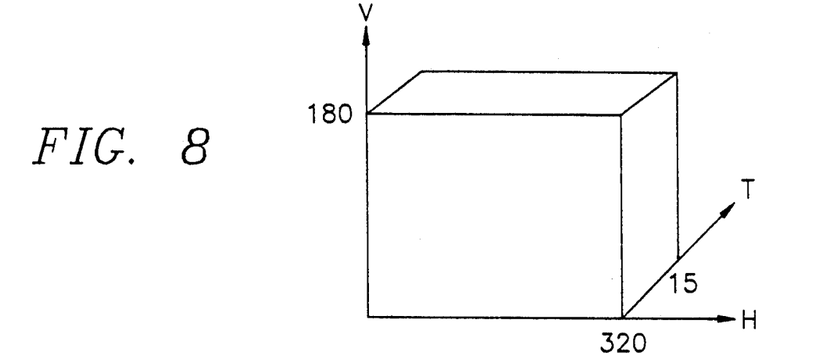
FIG. 8 is an enlarged view of FIG, 7.

The video signals processed by the compression circuit 501, as shown in FIG. 8, are applied to the QMF separation circuit 502 to perform the low-pass-filtering of a given band via the second horizontal low pass filter 301 and the high-pass-filtering of the given band via the first horizontal high pass filter 303.

The output of the second horizontal low pass filter 301 is sampled down by the fourth sampler 302 at 2:1, while the output of the first horizontal high pass filter 303 is sampled down by the fifth sampler 304 at 2:1.

The output of the fourth sampler 302 is vertically low-pass-filtered by the second vertical low pass filter 305, and high-pass-filtered by the first vertical high pass filter 307. The output of the second vertical low pass filter 305 is sampled down by the sixth sampler 306 at 4:1, thereby generating the first division region LL. The output of the first vertical low pass filter 307 is sampled down by the seventh sampler 308 at 4:1, producing the second division region LH.

The output of the fifth sampler 304 is low-pass-filtered via the third vertical low pass filter 309, and sampled down by the eighth sampler 310 at 4:1, producing the third division region HL by dividing the band. On the other hand the output of the fifth sampler 304 is vertically high-pass-filtered via the second vertical high pass filter 311, and sampled down by the ninth sampler 312 at 4:1, producing the fourth division region HH.

The fundamental principles of the QMF for dividing the band into four division regions are disclosed in "A Filter Family Designed Use in Quadrature Mirror Filter", PP291-204, IEEE, Published in Apr., 1980.

The band of FIG. 8 is divided twice by means of the circuit of FIG. 2, as shown in FIG. 9. The band finally becomes as shown by the shaded portion in FIG. 10, comprising 45 vertical pixels and 80 horizontal pixels in the first region LL.

The first division region LL component of the output of the QMF separation circuit 502 is applied to the DC extraction circuit 503, thereby extracting the DC component from the LL component and transmitting the DC component as digital data. The present applicant previously disclosed the DC extraction circuit 503.

The output value (+) of the first division region LL and the value (−) of the DC extraction circuit 503 are added by the fourth adder 54 to produce the differential signal LL'.

The differential signal LL' and the outputs LH, HL and HH of the QMF separation circuit 502 may be subsequently transmitted as analog signals, together with the digital data produced from the DC extraction circuit 503.

The differential signal LL' and the signals LH, HL and HH are applied to the decoded of FIG. 6, while the output of the DC extraction circuit 503 is interpolated at the interpolator 601. Accordingly, the differential signal LL' is added to the output of the interpolator 601 by the fifth adder 602 so as to produce the signal LL. The signals LL, LH, HL and HH are applied to the QMF combination circuit 603.

In the QMF combination circuit 603, the signals of the first to fourth regions LL, LH, HL and HH are respectively interpolated by the first through fourth interpolators 401 to 403, 408 and 409 at 1:4, and filtered via the vertical low and high pass filters 402, 404, 410 and 411.

The outputs of the fourth vertical low pass filter 402 and the third vertical high pass filter 404 are added by the first adder 405, and fifth vertical low and high pass filters 410 and the fourth vertical high pass filter 411 are added by the second adder 412. The outputs of the first and second adders 405 and 412 are interpolated by the fifth and sixth interpolators 406 and 413 at 1:2.

The outputs of the fifth and sixth interpolator 406 and 413 are horizontally filtered via the third horizontal low pass filter 407 and the second horizontal high pass filter 414, respectively, and are added by the third adder 415. Thereby, the shape of FIG. 9 is converted to the shape of FIG. 8. Then the signal of the FIG. 8 is respectively interpolated at the seventh, eighth and ninth interpolators 201, 203 and 205 horizontally at 1:2, vertically at 1:4 and temporally at 1:4, by up sampling. The interpolated signal is filtered via the temporal, vertical and horizontal low pass filters 202, 204 and 206. As a result, the signal of FIG. 8 is expanded as shown in FIG. 7.

Thus the DC component extracted from the first region LL may be transmitted as digital data without any information loss so as to emphasize the edges oft he image, thereby preventing degradation of the picture quality.

As stated above, the DC component extracted from the low frequency region LL containing most of the luminance and chrominance signals, is transmitted as digital data together with other components LH, HL and HH as analog signals, so that the transmission efficiency is improved and the degradation of the picture quality is prevented.

While the invention has been particularly shown and described with reference to the preferred specific embodiment thereof, it will be apparent to those who skilled in the art that in the foregoing, changes in form and detail may be made without departing from the spirit and scope of the present invention.

What is claimed is:

1. A method of processing a color signal of a high definition television, said color signal being sampled vertically, horizontally and temporally, and a given band of said color signal being separated into a plurality of analog sub-bands, said method comprising the steps of:
    extracting a digital direct current component signal from a first sub-band having vertical and horizontal low frequency components;
    adding said digital direct current signal to said first sub-band to generate a digital differential signal;
    transmitting digital signals of a second sub-band and said digital differential signal as output signals, and transmitting said output signals together with said digital direct current component signal, said second sub-band occupying all area of said given band except for an area occupied by said first sub-band;
    receiving and interpolating said digital direct current component signal to produce an interpolated digital direct current component signal;
    adding said interpolated digital direct current component signal to said digital differential signal to produce an added direct current signal; and
    vertically and horizontally interpolating said added direct current signal and said digital signals of said second sub-band to produce a combined signal.

2. A method according to claim 1, further comprising the step of:
    vertically, horizontally and temporally interpolating said combined signal, thereby expanding said combined signal.

3. An encoder used in a circuit for processing video signals of a high definition television, a given region occupied by said video signals being separated into four division regions, said encoder comprising:
    direct current extraction means for extracting a direct current component signal from a first division region of said four division regions, said first region being provided with low horizontal frequency and low vertical frequency components, and for transmitting said direct current component signal as a digital direct current component signal; and
    adder mean for adding an output of said first region to an output of said direct current extraction means, producing a differential signal of said first division region.

4. An encoder according to claim 3, further comprising:
    compression means for filtering said video signals horizontally, vertically and temporally, and for compressing the filtered signals; and
    separation means for filtering an output of said compression means in horizontal and vertical axes, and for down-sampling the filtered signals and thereby separating the filtered down-sampled signals into said four division regions.

5. A decoder used in a circuit for processing video signals of a high definition television, said video signals being separated into five division signals, a first division signal being in digital with a direct current component said decoder comprising:
    interpolator means for interpolating the digital direct current component signal, and
    adder means for adding an output of said interpolating means to a second division signal, said second division signal being provided with low horizontal frequency and low vertical frequency.

6. The decoder according to claim 5, further comprising:
 combination means for interpolating and horizontally and vertically filtering an output of said adder means and third to fifth division regions, thereby synthesizing them; and
 expansion means for filtering vertically, horizontally and temporally and interpolating an output of said combination means, thereby expanding said output of said combination means.

7. A method of processing a color signal of a television in order to transmit digital low frequency band signals, said color signal being separated into a plurality of sub-bands including a low component signal having horizontally low and vertically low components, said method comprising:
 extracting a digital direct current signal from said low component signal;
 adding said low component signal with said digital direct current signal to produce a differential signal;
 transmitting said digital direct current signal, said differential signal and any remaining sub-band signals of said color signal;
 receiving and interpolating said digital direct current signal to produce an interpolated signal; and
 adding said interpolated signal with said differential signal to produce a final low component signal.

8. The method as claimed in claim 7, wherein said method further comprises the steps of:
 compressing said color signal in the horizontal, vertical, and temporal axes to produce a compressed signal; and
 separating said compressed signal into said plurality of sub-bands, including said low component signal.

9. The method as claimed in claim 7, wherein said method further comprises the steps of:
 combining said final low component signal with said remaining sub-band signals of said color signal to produce a combined signal; and
 expanding said combined signal in the horizontal, vertical, and temporal axes.

10. The method as claimed in claim 8, wherein said method further comprises the steps of:
 combining said final low component signal with said remaining sub-band signals of said color signal to produce a combined signal; and
 expanding said combined signal in the horizontal, vertical, and temporal axes.

11. The method a claimed in claim 8, wherein said step of compressing said color signal comprises the steps of:
 low-pass-filtering the horizontal, vertical, and temporal axes of said color signal; and
 sampling said horizontal, vertical and temporal axes of said color signal.

12. The method as claimed in claim 8, wherein said step of separating said compressed signal comprises the steps of:
 horizontally low-pass-filtering and sampling said compressed signal to generate a first separated signal and then vertically low-pass-filtering and sampling said first separated signal to generate said low component signal;
 horizontally low-pass-filtering and sampling said compressed signal to generate a second separated signal and then vertically high-pass-filtering and sampling said second separated signal to generate a first digital signal;
 horizontally high-pass-filtering and sampling said compressed signal to generate a third separated signal and then vertically low-pass-filtering and sampling said third separated signal to generate a second digital signal; and
 horizontally high-pass-filtering and sampling said color signal to generate a fourth separated signal and then vertically high-pass-filtering and sampling said fourth separated signal to generate a third digital signal.

13. The method as claimed in claim 10, wherein said step of separating said compressed signal comprises the steps of:
 horizontally low-pass-filtering and sampling said compressed signal to generate a first separated signal and then vertically low-pass-filtering and sampling said first separated signal to generate said low component signal;
 horizontally low-pass-filtering and sampling said compressed signal to generate a second separated signal and then vertically high-pass-filtering and sampling said second separated signal to generate a first digital signal;
 horizontally high-pass-filtering and sampling said color signal to generate a third separated signal and then vertically low-pass-filtering and sampling said third separated signal to generate a second digital signal; and
 horizontally high-pass-filtering and sampling said compressed signal to generate a fourth separated signal and then vertically high-pass-filtering and sampling said fourth separated signal to generate a third digital signal.

14. The method as claimed in claim 13, wherein said step of combining said final low component signal with the remaining sub-band signals of said color signal further comprises:
 sampling and vertically low-pass-filtering said low component signal to generate a first intermediate signal;
 sampling and vertically high-pass-filtering said first digital signal to generate a second intermediate signal;
 sampling and vertically low-pass-filtering said second digital signal to generate a third intermediate signal;
 sampling and vertically high-pass-filtering said third digital signal to generate a fourth intermediate signal;
 adding said first intermediate signal and said second intermediate signal to generate a fifth intermediate signal;
 adding said third intermediate signal and said fourth intermediate signal to generate a sixth intermediate signal;
 sampling and horizontally low-pass-filtering said fifth intermediate signal to generate a seventh intermediate signal;
 sampling and horizontally high-pass-filtering said sixth intermediate signal to generate a eighth intermediate signal; and
 adding said seventh intermediate signal with said eighth intermediate signal to generate said combined signal.

15. A circuit for processing a video signal of a television into a digital direct current signal, said video signal divided into first through fourth division regions, and said first division region having a low horizontal frequency component and a low vertical frequency component, said circuit comprising:

extraction means for extracting the digital direct current signal from said first division region; and first adder means for adding said digital direct current signal with said first division region to produce a differential signal.

16. The circuit as claimed in claim 15, further comprising:

compression means for horizontally, vertically, and temporally compressing said video signal into a compressed signal;

separation means for horizontally and vertically separating said compressed signal into said first through fourth division regions.

17. The circuit as claimed in claim 16, wherein:

said compression means comprises:

first plurality of low-pass-filter means for horizontally, vertically, and temporally filtering said video signal; and first plurality of sampling means for horizontally, vertically, and temporally sampling said video signal; and said separation means comprises:

second plurality of low-pass-filter means and a first plurality of high-pass-filter means for horizontally and vertically filtering said compressed signal; and second plurality of sampling means for horizontally and vertically sampling said compressed signal.

18. The circuit as claimed in claim 16, further comprising:

interpolator means for interpolating said digital direct current signal to produce an interpolated signal; and second adder means for adding said interpolated signal with said differential signal to produce a new first division region signal.

19. The circuit as claimed in claim 18, further comprising:

combination means for vertically and horizontally combining said new first region signal and said second through fourth division regions to produce a combined signal; and expansion means for horizontally, vertically, and temporally expanding said combined signal.

20. The circuit as claimed in claim 19, wherein:

said combination means further comprises:

first plurality of interpolator means for horizontally and vertically interpolating said new first division region signal and said second through fourth division regions;

third plurality of low-pass filter means and second plurality of high-pass-filter means for horizontally and vertically filtering said new first division region signal and said second through fourth division regions; and plurality of adding means for adding said first division region signal and said second through fourth division regions to produce said combined signal; and said separation means comprising:

second plurality of interpolator means for horizontally, vertically, and temporally interpolating said combined signal; and fourth plurality of low-pass-filter means for horizontally, vertically, and temporally filtering said combined signal.

* * * * *

UNITED STATES PATENT AND TRADEMARK OFFICE
CERTIFICATE OF CORRECTION

PATENT NO. : 5,307,143
DATED : April 26, 1994
INVENTOR(S) : Hun-Seok Oh

It is certified that error appears in the above-indentified patent and that said Letters Patent is hereby corrected as shown below:

Column 2,

Line 21,     change "decimator" to --sampler--; and Column 3,     Line 14,     before "the output", insert --the output of the fourth vertical low pass filter 402 is added to--.

Signed and Sealed this

Twenty-seventh Day of December, 1994

*Attest:*

BRUCE LEHMAN

*Attesting Officer*      *Commissioner of Patents and Trademarks*